March 12, 1968  W. E. MORRISON  3,372,616
OPTICAL REPRODUCTION APPARATUS
Filed Oct. 2, 1963  2 Sheets-Sheet 1

William E. Morrison
INVENTOR.

BY Hayden & Pravel
ATTORNEYS

March 12, 1968   W. E. MORRISON   3,372,616
OPTICAL REPRODUCTION APPARATUS
Filed Oct. 2, 1963   2 Sheets-Sheet 2

William E. Morrison
INVENTOR.

BY Hayden & Pravel

ATTORNEYS

United States Patent Office 3,372,616
Patented Mar. 12, 1968

3,372,616
OPTICAL REPRODUCTION APPARATUS
William E. Morrison, 3 Sleepy Oaks Lane,
Houston, Tex. 77024
Filed Oct. 2, 1963, Ser. No. 313,237
16 Claims. (Cl. 88—24)

ABSTRACT OF THE DISCLOSURE

An optical apparatus for illuminating a selected area and for viewing and/or recording the area illuminated along the same line of sight.

---

The present invention relates to new and improved optical apparatus, and particularly new and improved optical apparatus for illuminating a selected area.

In the past, optical apparatus have been used to illuminate and also to photograph or otherwise make optical reproductions of both moving and still objects; however, such apparatus generally has the disadvantage of not allowing the object to be viewed and illuminated and photographed or otherwise reproduced optically along a single line of sight.

Because the small angular separation between the respective lines of sight of the viewer and of the apparatus for making the optical reproduction makes a great difference in their respective views, it is practically impossible for the viewer or one making the optical reproduction to determine accurately what portion of the object is being reproduced in advance. By and large such pictures or optical reproductions are made on a trial and error basis which is wasteful and time consuming.

Also, in optically reproducing an object located in a narrow cone or recess when only a small amount of ambient light illuminates the object, a beam of illuminating light directed to the object frequently casts intense shadows which obscure important details of the object or the light source itself interferes with the view of the reproducing apparatus or of the viewer or both.

Further problems are presented where the object being reproduced optically is mobile rather than substantially stationary. As the object moves laterally relative to the optical axis of the optical apparatus, there is the problem of keeping the object in the field of the camera or other means for making an optical reproduction of the object. As the object moves longitudinally relative to the optical axis of the apparatus, there is the problem of keeping the object in focus. The problem is further complicated when the object moves diagonally relative to the optical axis of the apparatus as both field and focus considerations are involved.

Another problem is encountered in televising or making other optical reproductions of manipulations or operations such as would be performed on a tooth or in the mouth of a dental patient or other similarly restricted object where it may be desirable to rapidly change the field of coverage or vary the magnification of the object or a portion thereof in making the optical reproduction.

It is therefore an object of the present invention to provide a new and improved optical apparatus for illuminating and making optical reproductions of a selected area.

Another purpose of the present invention is to provide a new and improved optical apparatus for making available a view of an object along substantially the optical axis of the reproducing apparatus while an optical reproduction of the object is being made.

A further purpose of the present invention is to provide a new and improved optical apparatus for illuminating and making optical reproductions of an object within a narrow cone of visibility in which the field illuminated by the illuminating source coincides substantially with the field of coverage of the optical reproduction.

Still another object of the present invention is to provide a new and improved optical apparatus having parallel lenses for illuminating light and reflected light from an object to optically reproduce such object on film or on a television screen.

Another object of the present invention is to provide a new and improved optical apparatus having reversible lenses which may be reversed to vary the field width of the optical apparatus.

A further object of the present invention is to provide a new and improved optical apparatus having a pair of parallel rotatable turrets housing a plurality of reversible lens components which may be aligned in various combinations on a common optical axis for varying the field width of the optical apparatus.

And yet another object of the present invention is to provide a new and improved optical apparatus for making optical reproductions of an object wherein a virtual image visually represents the plane of critical focus of the camera lens.

A particular object of the present invention is to provide a new and improved optical apparatus having a combination illuminating light focusing lens and an object light collimating lens for illuminating and making optical reproductios of an object.

A specific object of the present invention is to provide a new and improved optical apparatus for illuminating, viewing, and making visual reproductions of movable objects wherein the plane of critical focus of the optical apparatus is presented visually by a virtual image and wherein a beam of visible light illuminates and defines the field of coverage by the apparatus in the plane of critical focus.

Another object of the present invention is to provide a new and improved optical apparatus for illuminating, viewing, and making optical reproductions of objects wherein a virtual image visually represents the plane of critical focus of the camera lens and a beam of illuminating light defines the field of coverage of the camera in such plane and having means for varying the field width of the camera lens and the size of the beam of illuminating light defining such field over a broad range of graduated sizes.

The preferred embodiment of this invention will be described hereinafter together with other features thereof, and additional objects will become evident from such description.

The invention will be more readily understood from a reading of the following specification and by reference to the accompanying drawings forming a part thereof wherein an example of the invention is shown and wherein.

Figure 1:
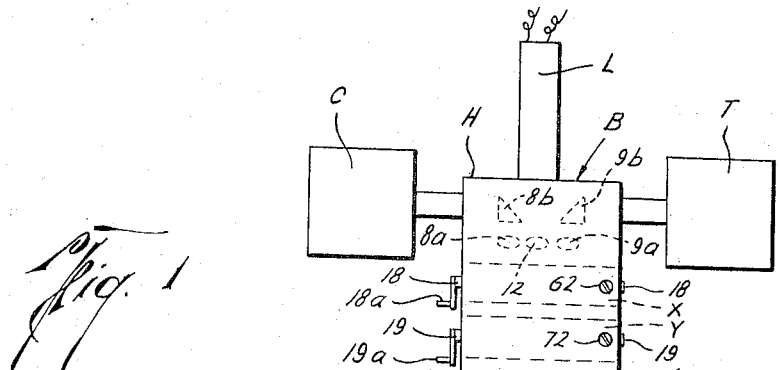
FIG. 1 is an elevational view, partly in perspective, illustrating the apparatus of the present invention positioned for illuminating and making an optical reproduction of an object as it is viewed by a viewer.

In the drawings, the letter B (FIG. 1) designates generally the device of the present invention which includes a housing H for supporting a lens assembly A for directing a beam of light 10 from a light source L to an object O and also for directing similar beams of light from the object O to an apparatus such as a motion picture camera C and/or a television camera T for making optical reproductions of the object O.

Briefly, with the present invention, a viewer V may actually view the object O on a line of sight which is parallel to and coincident with the optical axis of illumination and of the optical axis of the apparatus making the optical reproduction. Also, as will be explained in detail, the field of illumination and the focus thereof may be readily varied for different conditions of use whether the object O is mobile or stationary.

Considering the invention more in detail, the lens assembly A comprises parallel rotatable drum turrets X and Y for varying the field width of the beam of light 10 from the light source L as well as varying the field width of the beams of light 8 and 9 passing from the object O to the cameras C and T, respectively, as will be explained more fully hereinafter. The lens assembly A also includes the lens 15 for focusing the illuminating light 10 beamed on the object O and for collimating the rays of light 8 and 9 received from the object O to render such rays of light parallel. Focusing or projecting lenses 8a and 9a are also provided in the lens assembly A for focusing the beams of light 8 and 9 in the cameras C and T, respectively, and prisms 8b and 9b are provided adjacent the cameras C and T, respectively, for bending the beams of light 8 and 9 into such cameras C and T.

The apparatus of the present invention also includes a deflecting mirror M and a partial mirror or beam splitter P which are provided for changing the direction of light beamed from the light source L to the object O and also for changing the paths of light 8 and 9 from the object O to the cameras C and T to allow a viewer V to view the object O along a line of view 7 that is substantially coincident with the beams 8, 9 and 10.

Figure 2:
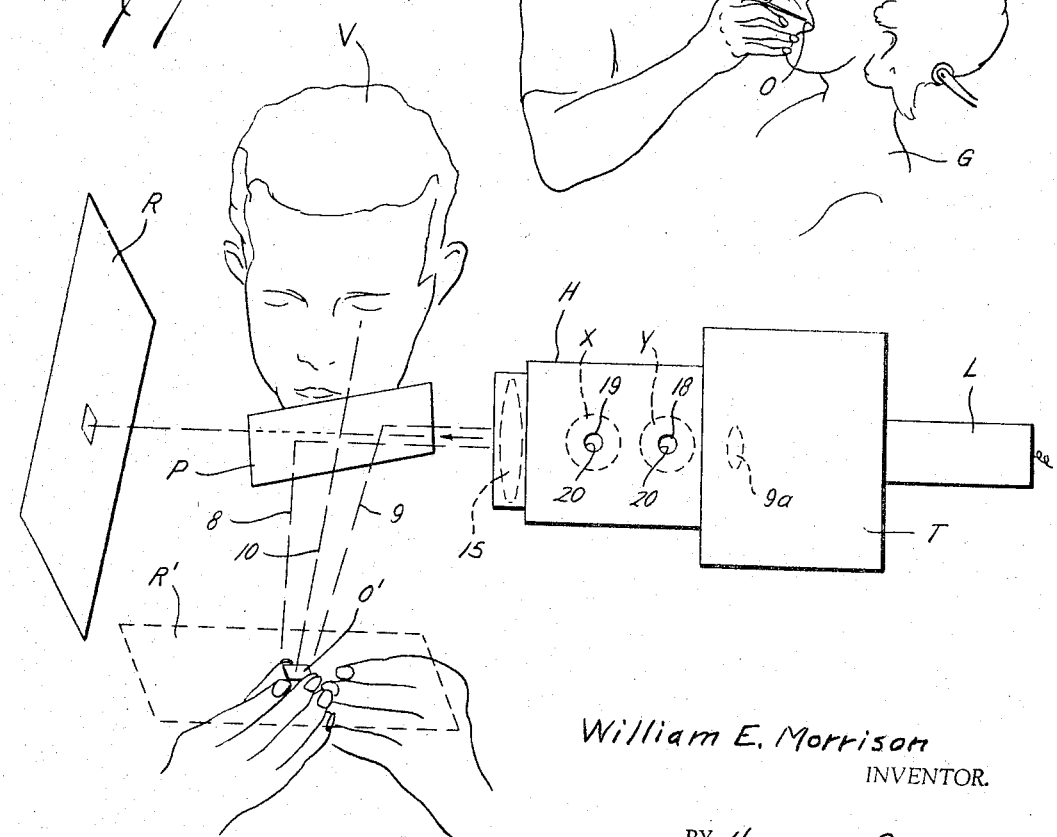
FIG. 2 is an elevational view, partly in perspective, showing the apparatus of the present invention arranged for making an optical reproduction of a movable object along the line of sight of a viewer with a visual plane of reference indicating the plane of critical focus of the apparatus.

In FIG. 2 of the drawings, the object O' is hand held or otherwise easily movable and therefore the deflecting mirror M is omitted and a reticle or reference screen R is included to superimpose a virtual image R' of the screen R on the partial mirror or beam splitter P to assist the viewer V in keeping the object O' in focus as will be explained more fully hereinafter.

Figure 3:
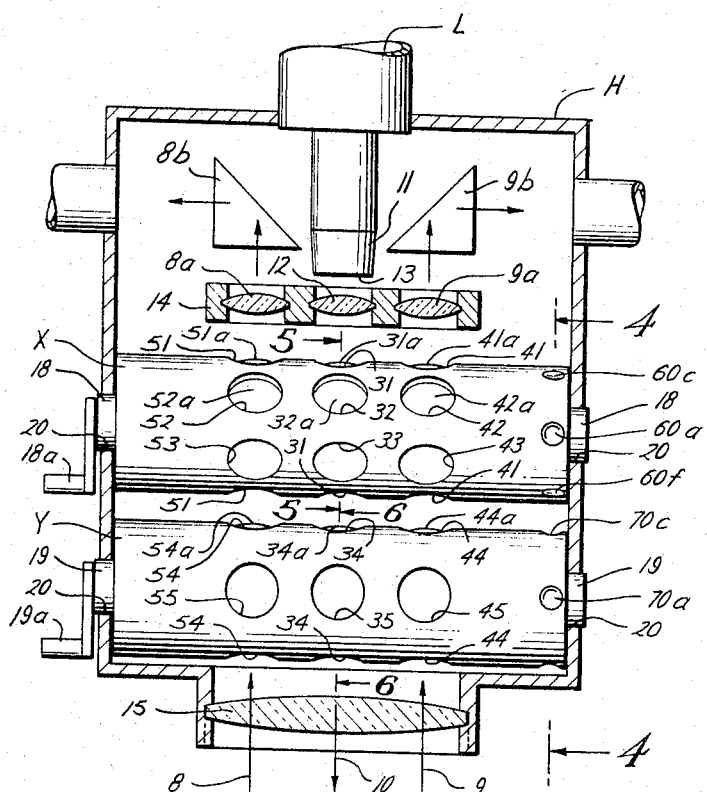
FIG. 3 is a view partly in elevation and partly in section illustrating details of construction of the present invention.

As illustrated in FIGS. 1 and 3 of the drawings, the light source or lamp L is mounted at the rear of the housing or case H in which the lens assembly A is supported. The light source L is preferably of a type which emits a spectrum of light that is compatible to both color film and television reproduction, such as a short arc lamp of the xenon variety. Although other suitable lights may be used, the light source L must produce a beam of light 10 sufficiently bright to override the ambient light falling on the object O from other sources to visibly define a field or spot as will be described more fully hereinafter. The light source L also includes a light condenser or other suitable light collecting means 11 for converging light from the light source L and focusing such light on a collimating lens 12 in the lens assembly A. The light source L also includes an aperture 13 of a desired size and aspect ratio which is positioned at the focal length of the collimating lens 12 to give the illuminating beam 10 the desired configuration and dimensions. A rectangular aperture of four units horizontally and three units vertically is preferred as this is the aspect ratio of standard television systems and is also suitable for motion picture reproduction; however, the illuminating beam 10 may be given other aspect ratios or configurations as desired by changing the aperture 13.

The lens assembly A also includes the illuminating light collimating lens 12 which renders the rays of light comprising the illuminating beam 10 parallel between the lens 12 and the illuminating light focusing lens 15. Each lens 15 is positioned on the opposite side of the turrets X and Y from the lens 12 and coaxially thereof for focusing the illuminating beam 10 on the object O. The lens 15 also functions as a collimating lens to render parallel the rays of light 8 and 9 received from the object O for a purpose which will be explained more fully herein.

The parallel drums or turrets X and Y which house the optical instruments for varying the field width of the parallel beams 8, 9, and 10 are positioned in the lens assembly A between the illuminating light focusing lens 15 mounted at the front of the housing H, and the focusing lenses 8a and 9a and the illuminating light collimating lens 12 mounted at the rear of the housing H in the lens carrier 14. The drum turrets X and Y are mounted in the housing H with their respective longitudinal axes parallel to each other and perpendicular to the optical axes of the parallel beams 8, 9, and 10. Each of the rotatable turrets X and Y is carried on a pair of axles or shafts 18 and 19, respectively, extending axially from the opposite ends thereof and journaled in suitable bearings or openings 20 in the housing H. Suitable power means such as indicated by the cranks 18a and 19a are connected to one end of each axle 18 and 19, respectively, for rotating the respective turrets X and Y independently of each other. In actual practice, the turrets are turned with an electric motor or other power source which will be readily understood by those skilled in the art.

Considering first the arrangement of the optical lenses provided for varying the field width of the beam of illuminating light 10, the turret X has a plurality of substantially cylindrical diametrical passages or tubes 31, 32, and 33 extending diametrically therethrough at substantially equally spaced distances circumferentially thereof, each of which is arranged for alignment coaxially with the longitudinal axis of the beam 10 upon rotation of the turret or drum X.

In the preferred form of the present invention, two optical lenses, one positive and another negative, are arranged in each passage 31 and 32, respectively, to provide Galilean type telescopes or field width varying lens combinations to vary the field width of the beam of light 10 passing therethrough. The positive lens 31a and the negative lens 31b are separated in the passage 31 by a distance equal to the sum of their respective focal lengths. Similarly, the positive lens 32a and the negative lens 32b are separated by a distance equal to the sum of their respective focal lengths in the passage 32. The Galilean type telescopes in the passages 31 and 32 have reciprocal magnifying powers. For example, normally the magnifying power of the Galilean type telescope in the passage 31 is two and one-half times when light from an object enters through its positive lens 31a and its magnifying power is four-tenths when light from an object enters through its negative lens 31b. The Galilean type telescope in the passage 32 usually has a magnifying power of one and six-tenths as to light from objects entering through the positive lens 32a and a magnifying power of sixty-three hundredths as to light from objects entering through its negative lens 32b.

Thus, by rotating the turret X in which the lenses 31a and 31b are diametrically mounted 180°, the optical alignment of the lenses 31a and 31b may be reversed to present reciprocal degrees of magnification with the one Galilean type telescope in the passage 31. By rotating the turret X to reverse the optical alignment of the lenses 32a and 32b, mounted in the passage 32, another pair of reciprocal field width varying factors or degrees of magnification may be selected for application to the beam 10 passing through the turret X. Also, for a purpose to be described more fully hereinafter, the passage 33 is open to allow the beam 10 to pass through without changing or magnifying its field width. However, optical lenses may also be placed in the passage 33 if desired.

Similarly, the turret Y has a plurality of cylindrical passages 34 and 35 which extend diametrically therethrough and which are also positioned for alignment coaxially with the longitudinal axis of the beam 10 upon rotation of the turret Y. The passage 34 houses a Galilean type telescope comprises of a positive lens 34a and a negative lens 34b which are separated in the passage 34 by a distance equal to the sum of the focal lengths of the lenses 34a and 34b, respectively. In the preferred form of the invention, the power of magnification of light from an object which enters through the positive lens 34a is two times and the magnifying power of light from an object entering through the negative lens 34b is one-half times. Also, the passage 35 is open through the turret Y to allow the beam 10 to pass therethrough unchanged.

In order to align the Galilean type telescopes mounted in the turrets X and Y, respectively, in various combinations to provide additional variations in the field width of the beam 10, the lenses in the passages 31 and 32 and the open passage 33 in the turret X are adapted for alignment optically with the lenses in the passage 34 or the open passage 35 through the turret Y by rotation of the respective turrets X and Y about their longitudinal axes. Thus, by rotating turrets X or Y, either end of the Galilean type telescopes mounted in the passages 31 or 32 may be aligned with either the open passage 35 or either end of the Galilean type telescope mounted in the passage 34 in the turret Y, or, either end of the Galilean type telescope mounted in the passage 34 may be aligned with the open passage 33 in the turret, thus providing an aggregate of thirteen different combinations of lenses providing thirteen different degrees of field width magnification. By using the various combinations available with the various powers of magnification of the telescopes in the passages 31, 32 and 34 indicated previously, the field width of the beam 10 may be varied in accordance with the following thirteen different field width magnification factors: one, one and one-half, two, two and one-half, three, four, five, six, eight, ten, twelve, sixteen and twenty-five. It will be understood that other Galilean type telescopes with different powers of magnification and different combinations thereof may be used so as to obtain different magnification factors without departing from the scope of the present invention.

To vary the field width of the beam 9 to correspond to the field width of the beam 10, the turret X has passages, 41, 42, and 43 provided therethrough which, like the passages 31, 32, and 33, extend diametrically through the turret X with their longitudinal axes intersecting the axis of rotation of the turret X at a common point. Also, the passages 41, 42, and 43 are spaced circumferentially around the turret X in lateral alignment with the passages 31, 32, and 33, respectively. The passages 41 and 42 are provided to house Galilean type telescopes which are identical to the corresponding Galilean type telescopes in the passages 31 and 32, respectively. Similarly, the passage 43 is open through the turret X as is the corresponding passage 33. The Galilean type telescopes in the passages 41 and 42 are positioned in the turret X for alignment of their respective optical axes coincident with the longitudinal axis of the beam 9 upon rotation of the turret X so that when the optical axis of the lenses in passage 41 or 42 is aligned coincident with the longitudinal axis of the beam 9, the optical axis of the corresponding lenses in passage 31 or 32 is aligned coincident with the longitudinal axis of the parallel beam 10.

The passage 43 is also positioned in the turret X for alignment with the longitudinal axis of the beam 9 when the passage 33 is aligned with the corresponding parallel beam 10 to allow the beams 9 and 10 to pass through the turret X unchanged.

Similarly, the turret Y has passages 44 and 45 provided therein corresponding to passages 34 and 35 and which, like passages 34 and 35, extend diametrically therethrough and have their longitudinal axis intersecting a common point on the axis of rotation of the turret Y. The passages 44 and 45 are spaced around the circumference of the turret Y in lateral alignment with the corresponding passages 34 and 35.

A Galilean type telescope which is identical to the Galilean type telescope in the passage 34 is housed in the passage 44; the passage 45 has no lens therein so that it is open through the turret Y as is the passage 35 to allow the beam 9 to pass unchanged therethrough. Also, the passages 44 and 45 are positioned in the turret Y so that upon a rotation of the turret Y, each passage may have its longitudinal axis aligned coincident with the longitudinal axis of the beam 9.

To vary the field width of the beam 8 to correspond to the field width of the beams 9 and 10, respectively, the turret X has provided therein passage 51, 52, and 53, which are similar to the corresponding passages 41, 42, and 43 as well as the passages 31, 32, and 33 in that the passages 51, 52, and 53 extend diametrically through the turret X at a common point on the axis of rotation thereof and are also spaced circumferentially around the turret X in lateral alignment with the corresponding passages 31, 32, and 33 as well as 41, 42, and 43. The passages 51 and 52 are adapted to house Galilean type telescopes which are identical to the corresponding Galilean type telescopes in the passages 31 and 32, respectively. The lenses or Galilean type telescopes in the passages 51 and 52 are positioned in the turret X so that upon rotation thereof, the optical axis of each of such Galilean type telescopes is aligned coincident to the longitudinal axis of the beam of light 8 passing therethrough. Also, the passage 53 has no lens therein so that it is open through the turret X as are the corresponding passages 33 and 43.

Likewise, the turret Y has provided therein passages 54 and 55 corresponding to the passages 34 and 35 and the passages 44 and 45, respectively. The passages 54 and 55 extend diametrically through the turret Y in lateral alignment with the corresponding passages 34 and 35, and 44 and 45. A Galilean type telescope is housed in the passage 54 which is identical to the Galilean type telescope in the passage 34. The passage 55, like its counterparts 35 and 45, are open through the turret Y to allow the beam of light 8 to pass therethrough unchanged. The lenses in the passage 54 are positioned in the turret Y for alignment of their optical axis with the longitudinal axis of the beam 8 upon a proper positioning of the turret Y.

Figure 4:
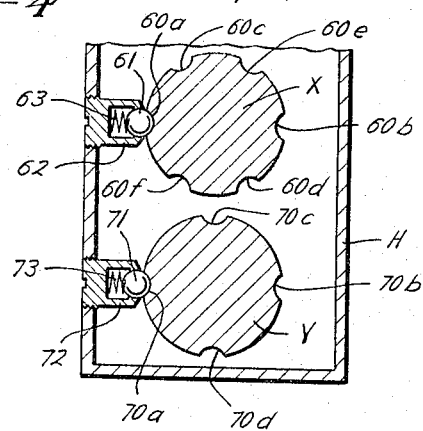
FIG. 4 is a sectional view taken on line 4—4 of FIG. 3 showing construction details of the present invention.
Figure 5:
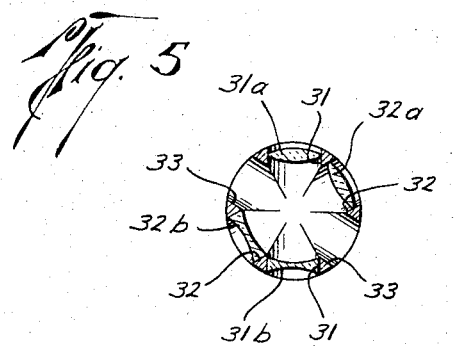
FIG. 5 is a sectional view taken on line 5—5 of FIG. 3 showing construction details of one turret of the present invention.
Figure 6:
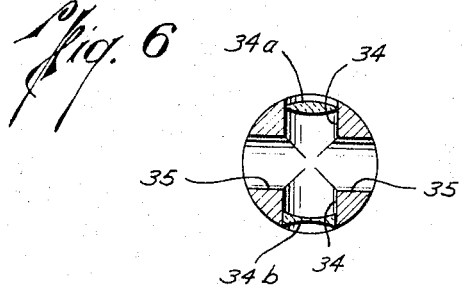
FIG. 6 is a view, also in section, taken on line 6—6 of FIG. 3 showing construction details of another lens turret of the present invention.

Some means are generally provided for assuring alignment of the corresponding telescopes in the two turrets X and Y to get the desired field size for the illumination of the object O. Such means may be any releasable locking means, whether electro-mechanical or entirely mechanical. In practice, the electro-mechanical system of a known type is preferred but for illustration purposes, a simple mechanical mechanism is illustrated in FIG. 4. As shown therein, rotatable turrets X and Y each have a plurality of shallow hemispherical recesses spaced circumferentially thereof with one of such recesses in longitudinal alignment with the ends of each corresponding group of diametrical passages, such as the recess 60a which is in alignment with one end of the corresponding group of passages 31, 41 and 51. Another recess 60b is in alignment with the opposite ends of the corresponding group of passages 31, 41 and 51. Similarly, a depression 60c is in alignment with one end of the group of passages 32, 42 and 52 and a recess 60d is in alignment with the opposite ends of such passages. Also, another recess 60e is in alignment with one end of the corresponding passages 33, 43 and 53 and a recess 60f is in alignment with the opposite ends of such passages.

In the turret Y, the depression 70a is in alignment with one end of the group of passages 34, 44 and 54 and a recess 70b is in alignment with the opposite ends of the group of passages 34, 44 and 54. Also, a recess 70c is in alignment with one end of the open passages 35, 45, and 55 and a cup 70d is in alignment with the opposite ends of the group of such passages.

The recesses or depressions 60a–f inclusive are provided for receiving a resilient locking member 61 to hold the turret X in a predetermined position when a selected group of corresponding telescopes or open passages are aligned with the beams of light 8, 9 and 10. The resilient locking member 61 may be a ball which is mounted in the end of a tubular housing 62 and is urged into engagement with the turret X by a spring 63, also mounted in the tubular housing 62. As the turret X is rotated axially in either direction, the ball 61 is constantly urged into engagement with the turret X. When any of the depressions 60a–f inclusive are aligned with the ball or resilient locking member 61, the spring 63 urges the ball out of the housing and into the particular depression aligned therewith to hold the turret X against axial rotation. As the turret X is rotated in either direction the hemispherical ball 61 is forced out of one of the depressions 60a–f and into the tubular housing until another one of the recesses 60a–f inclusive is aligned therewith. Thus, a positive releasable locking means is provided for the turret X.

A ball or resilient locking member 71 is provided with the turret Y to releasably hold the turret Y against axial rotation. The ball 71 is mounted adjacent to turret Y in a tubular housing 72 and a spring 73 also mounted in a tubular housing 72 constantly urges the ball 71 into engagement with the turret Y. When any of the depressions 70a–d inclusive are aligned with the ball 71, the ball 71 is urged out of the tubular housing 72 by the spring 73 to releasably hold the turret Y against axial rotation. When the turret Y is rotated in either direction the ball 71 is forced back into the tubular housing 72 until another of the recesses or depressions 70a–d is aligned therewith.

Thus by rotating the turret X and/or the turret Y, either end of two groups of three identical telescopes or three open passages in the turret X and either end of one group of identical telescopes or open passages mounted in the turret Y, may be aligned with three parallel beams of light 8, 9 and 10 to simultaneously and uniformly vary their respective field widths of each of such beams.

The rays of light forming the beam 10 are parallel as they pass through the turrets X and Y from the illuminating light collimating lens 12 to the illuminating light focusing lens 15.

The illuminating light focusing lens 15 serves as a collimating lens rendering the rays of light comprising the beams 8 and 9 returning from the object O parallel to each other as well as parallel to the beam 10 entering the lens 15 from the light source L on the opposite side thereof from the object O. Thus the beams of light 8 and 9 passing through the turrets X and Y are parallel as are the rays of light comprising the beam 10. Thus, by beaming the light 10 through an aperture 13 of a predetermined aspect ratio and then through a series of field width control or magnification lenses in the turrets X and Y that are identical to the lenses in the turrets X and Y through which the returning beams of light 8 and 9 returning from the object O, pass, the field width of the beams 8 and 9 is identical to the field width of the beam 10 and the rectangular spot or field illuminated by the beam 10 at the object O is congruent with the field of the cameras C and T due to the predetermined size of the beam 10. Whatever portion of the object O is illuminated by the rectangular illuminating beam will be recorded by the cameras C and T. Also, as the turrets X and Y are rotated they simultaneously position identical lenses in each beam of 8, 9 and 10, respectively, to make corresponding changes or variations in the field width of each beam 8, 9 and 10 simultaneously.

In the operation of the apparatus B of the present invention the beam of illuminating light 10 is rendered parallel by its collimating lens 12 before passing through the field width varying lenses in the turrets X and Y to its focusing lens 15 which focuses the beam 10 on the object O such as a tooth in the mouth of a patient G. The beams of light 8 and 9 respectively returning from the object O are rendered parallel by the lens 15 before passing through field width varying lenses in the turrets X and Y identical to the lenses through which the beam 10 passed to make the field width of the beams 8, 9 and 10 substantially identical. The aspect ratio given the beam 10 by the aperature 13 is the same as that of the film gate in a film camera C or the scanned area of the television camera T so that the rectangular spot of illuminating light defines the area that is reproduced optically. The beams 8 and 9 are each focused by their respective focusing lenses 8a and 9a and are deflected by their prisms 8b and 9b, respectively, into the cameras C or T. If it is desired, a pair of motion picture cameras C or a pair of television cameras T may be used simultaneously for producing a steroscopic effect, or either type of camera may be used singly with the lens assembly A of the present invention.

In using the apparatus B of the present invention for viewing and optically reproducing an object, such as a tooth situated in a narrow cone of visibility such as a mouth, the apparatus may be mounted on an easily movable and adjustable height frame or stand (not shown). The apparatus B is preferably positioned between a demonstrator-viewer V and a patient G so as to allow the demonstrator to view the area of the patient's mouth in which he is working along the line of sight 7 which is superimposed on or substantially coincident with the optical axis of the beam 10. The focal length of the illuminating light focusing lens 15 determines the distance at which the apparatus B is situated from to the object O such as the mouth or a tooth of the patient G. In using a television camera T with the apparatus B, a television monitor (not shown) will normally be employed to determine when the object O is in sharp focus. Also, it should be noted that the mirror M and the partial mirror P are each pivotally mounted on frames or supports (not shown) for panning and tilting relative to the optical axis of the lens 15 to conveniently align the beams 8, 9 and 10 and the line of sight 7. The mirror M and the beam splitter P may also be easily adjusted to correspond to changes in the view of the viewer or dentist V, such as shifting laterally from one side of the mouth to the other or from one tooth to another.

In FIG. 2, another form of the present invention is illustrated which is constructed identically to the apparatus of FIGS. 1, 3, 4, 5 and 6, except for the mirror and viewing portions. The parts of FIG. 2 which are identical to the parts of FIG. 1 have the same numerals and/or letters. The deflection mirror M of FIG. 1 is omitted from the arrangement of FIG. 2 but the partial mirror P is employed together with a reference board R. Such board R preferably has a black background with a white frame around its perimeter, and is positioned in the line of the optical axis of the light focusing lens 15 at the plane of critical focus thereof. The beam splitter or partial mirror P intersects the line of the optical axis of the lens 15 between the lens 15 and the reference board or reticle R. The partial mirror P creates a virtual image R' of the board R which appears in space the same distance from the mirror P as the board R is actually located, which in this case is the point or plane of critical focus of the lens 15. The partial mirror P may be positioned at any convenient point along the optical axis of the lens 15 between the lens 15 and the reticle R; the farther the partial mirror P is from the lens 15, the closer the virtual image R' is to the optical axis of the lens 15, and conversely, the closer the mirror P is to the lens 15 the farther the virtual image R' is from the optical axis of the lens 15.

In using this form of the invention, the object O' is positioned at a point in space where it appears to the viewer V to be in the window or frame of reference R'; the object O' will then be in the plane of critical focus of the cameras C and T and thus in sharp focus.

The rectangular beam of illuminating light 10 is projected by the lens 15 to the beam splitter or partial mirror P which deflects the rectangular beam 10 to the object O'. Similarly the rays of light 8 and 9 returning from the object O' are deflected by the beam splitter P to the lens 15 which renders the rays 8 and 9 parallel and directs them through the turrets X and Y to make their field width correspond substantially to that of the illuminating beam 10. Thus, any part of the object O' which is within the rectangular spot of illumination of the beam 10 will be within the field of coverage of the camereas C and T. The viewer V is on the opposite side of the beam splitter or partial mirror P and thus may observe the object O' along a line of sight that is coincidental with the beams 8, 9 and 10. The viewer V may manipulate the object O' horizontally to position it within the rectangular beam of light 10 and may move the object O' vertically to position it coincidentally with the virtual image R', thus bringing the object O' into both field and focus of the apparatus B.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. An apparatus for making an optical reproduction of an object, including:
   (a) a light source emitting an illuminating beam of light,
   (b) a first lens means for collimating light from said light source,
   (c) a second lens means for focusing collimated light from said light source on an object and for collimating light received from the object, and
   (d) focusing means for focusing the collimated light from the object to form an optical image of the object.

2. An apparatus for making an optical reproduction of an object, including:
   (a) a light source emitting an illuminating beam of light,
   (b) means defining the aspect ratio of the beam of illuminationg light from said light source,
   (c) a first lens means for collimating light from said light source,
   (d) a second lens means for focusing collimated light from said light source on an object and for collimating light received from the object, and
   (e) focusing means for focusing the collimated light from the object to form an optical image of the object.

3. An apparatus for making an optical reproduction of an object, including:
   (a) a light source emitting an illuminating beam of light,
   (b) a first lens means for collimating light from said light source,
   (c) a second lens means for focusing collimated light from said light source on an object and for collimating light received from the object,
   (d) a first pair of field width varying lenses for varying the field width of collimated illuminating light passing therethrough,
   (e) a second pair of field width varying lenses for varying the field with of collimated light from the object to correspond to the field width of the illuminating light, and
   (f) focusing means for focusing the collimated light from the object to form an optical image of the object.

4. An apparatus for making an optical reproduction of an object, including:
   (a) a light source emitting an illuminating beam of light,
   (b) a first lens means for collimating light from said light source,
   (c) a second lens means for focusing collimated light from said light source on an object and for collimating light received from the object,
   (d) a first pair of field width varying lenses for varying the field width of collimated illuminating light passing therethrough,
   (e) a second pair of field width varying lenses for varying the field width of collimated light from the object to correspond to the field width of the illuminating light,
   (f) means to reverse the longitudinal alignment of said first pair of field width varying lenses and said second pair of field width varying lenses to vary the field width of light passing therethrough by the reciprocal magnification of each of said pair of lenses.
   (g) focusing means for focusing the collimated light from the object to form an optical image of the object.

5. An apparatus for making an optical reproduction of an object, including:
   (a) a light source emitting an illuminating beam of light,
   (b) a first lens means for collimating light from said light source,
   (c) a plurality of pairs of field width varying lenses adapted for longitudinal alignment on a common optical axis for optically varying the field width of the light passing therethrough,
   (d) a second lens means for focusing collimated light from said light source on an object and for collimating light received from the object, and
   (e) focusing means for focusing the collimated light from the object to form an optical image of the object.

6. An apparatus for making an optical reproduction of an object, including:
   (a) a light source emitting an illuminating beam of light,
   (b) a first lens means for collimating light from said light source,
   (c) a plurality of pairs of field width varying lenses adapted for longitudinal alignment on a common optical axis for optically varying the field width of the light passing therethrough,
   (d) means to reverse the longitudinal alignment of each of said pairs of field width varying lenses to vary the field width of light passing therethrough by the reciprocal magnification of each pair of lenses, and
   (e) focusing means for focusing the collimated light from the object to form an optical image of the object.

7. An optical apparatus for illuminating and making an optical reproduction of an object in a narrow cone of visibility, including:
   (a) a support housing,
   (b) a light source emitting an illuminating beam of light,
   (c) collimating lens for collimating light from said light source,
   (d) a plurality of telescopes adapted for longitudinal alignment on a common optical axis for receiving collimated light from said light source,
   (e) lens means for focusing the collimated light from the light source on an object and for collimating light from the object,
   (f) a plurality of telescopes adapted for longitudinal alignment on a common optical axis for receiving collimated light from the object, (g) means for reversing the longitudinal axis of said telescopes to vary the field width of the collimated light passing therethrough, and (h) focusing means for focusing the collimated light from the object to form an image.

8. An apparatus for viewing an object while making an optical reproduction thereof including:

(a) a light source emitting an illuminating beam of light, (b) a first lens means for collimating light from said light source, (c) a second lens means for focusing collimated light from said light source on an object and for collimating light received from the object, (d) focusing means for focusing the collimated light from the object to form an optical image of the object, and (e) a semi-transparent light deflecting means for deflecting a portion of the beam passing through said lens means away from the optical axis thereof to illuminate an object and for viewing the illuminated object along substantially the path of said deflected light.

9. An apparatus for making an optical reproduction of an object, including:

(a) a light source emitting an illuminating beam of light, (b) a first lens means for collimating light from said light source, (c) a second lens means for focusing collimated light from said light source on an object and for collimating light received from the object, (d) focusing means for focusing the collimated light from the object to form an optical image of the object, and (e) means making available a view of the object along substantially the line of the illuminating light while an optical reproduction of the object is being made.

10. An optical apparatus for illuminating and making an optical reproduction of an object in a narrow cone of visibility including:

(a) a light source emitting a beam of illuminating light, (b) lens means for collimating said illuminating beam, (c) means for focusing said illuminating beam on the object and for collimating light from the object, (d) means to vary the field width of said collimated illuminating beam and of said collimated light from the object, said means comprising, (1) a plurality of rotatable turrets, (2) passages extending radially through said turrets, (3) a pair of lenses mounted in said passages, and (4) means to rotate said turrets axially to align the passages in one of said turrets with the passages in another of said turrets, and (e) focusing means to focus the collimated light from said object in a camera.

11. An apparatus for making an optical reproduction of an object, including:

(a) a housing (b) a light source (c) a first lens means for collimating light from said light source, (d) a plurality of axially rotatable turrets carried in said housing (e) field width varying lens means mounted in each of said turrets, (f) means for rotating said turrets to align the optical axis of said field width varying lens means in one of said turrets coincident with the optical axis of said field width varying lens means in another of said turrets, (g) a second lens means for focusing collimated light from said light source on an object and for collimating light received from the object, and (h) focusing means for focusing the collimated light from the object to form an optical image of the object.

12. An optical apparatus for illuminating and making an optical reproduction of an object in a narrow cone of visibility including:

(a) a light source emitting a beam of illuminating light, (b) lens means for collimating said illuminating beam, (c) means for focusing said illuminating beam on the object and for collimating light from the object, (d) means to vary the field width of said collimated illuminating beam and of said collimated light from the object, said means comprising, (1) a plurality of rotatable turrets, (2) passages extending radially through said turrets, (3) a pair of lenses mounted in said passages, and (4) means to rotate said turrets axially to align the passages in one of said turrets with the passages in another of said turrets, and (e) focusing means to focus the collimated light from said object to form an image, (f) releasable locking means with each of said turrets for releasably locking said turrets against axial rotation, and (g) focusing means for focusing the collimated light from the object to form an optical image of the object.

13. An apparatus for making an optical reproduction of an object, including:

(a) a light source emitting an illuminating beam of light, (b) a first lens means for collimating light from said light source, (c) a second lens means for focusing collimated light from said light source on an object and for collimating light received from the object, (d) field width varying means for varying the field width of said collimated light, and (e) focusing means for focusing the collimated light from the object to form an optical image of the object.

14. An apparatus for making an optical reproduction of an object, including:

(a) a light source emitting an illuminating beam of light, (b) a first means for collimating light from said light source, (c) a second lens means for focusing collimated light from said light source on an object and for collimating light received from the object, (d) field width varying lenses for varying the field width of said collimated light from said light source, (e) field width varying lenses for varying the field width of said collimated light from the object, and (f) focusing means for focusing the collimated light from the object to form an optical image of the object.

15. An apparatus for making an optical reproduction of an object, including:

(a) a light source emitting an illuminating beam of light, (b) a first lens means for collimating light from said light source, (c) a second lens means for focusing collimated light from said light source on an object and for collimating light received from the object, (d) focusing means for focusing the collimated light from the object to form an optical image of the object, (e) means indicating the plane of critical focus of said second lens, and (f) reflective means for creating a virtual image of said last named means.

16. An apparatus for making an optical reproduction of an object, including:
 (a) a light source emitting an illuminating beam of light,
 (b) a first lens means for collimating light from said light source,
 (c) a second lens means for focusing collimated light from said light source on an object and for collimating light received from the object,
 (d) focusing means for focusing the collimated light from the object to form an optical image of the object,
 (e) means indicating the plane of critical focus of said second lens, and
 (f) a semi-transparent light deflecting means for creating a virtual image of said last named means and for viewing an object relative to said virtual image.

References Cited

UNITED STATES PATENTS

| | | | |
|---|---|---|---|
| 2,185,847 | 1/1940 | Harrison et al. | 88—24 |
| 3,138,059 | 6/1964 | White | 88—24 |

NORTON ANSHER, *Primary Examiner.*

R. A. WINTERCORN, *Assistant Examiner.*